US005190684A

United States Patent [19]

Yamashita et al.

[11] Patent Number: 5,190,684

[45] Date of Patent: Mar. 2, 1993

[54] RARE EARTH CONTAINING RESIN-BONDED MAGNET AND ITS PRODUCTION

[75] Inventors: Fumitoshi Yamashita, Ikoma; Masami Wada, Hirakata, both of Japan

[73] Assignee: Matsushita Electric Industrial Co., Ltd., Osaka, Japan

[21] Appl. No.: 638,437

[22] Filed: Jan. 7, 1991

Related U.S. Application Data

[63] Continuation-in-part of Ser. No. 380,598, Jul. 17, 1989, abandoned.

[30] Foreign Application Priority Data

Jul. 15, 1988 [JP] Japan ............................... 63-177809

[51] Int. Cl.$^5$ ....................... C04B 35/04; H01F 1/053

[52] U.S. Cl. .................................. 252/62.54; 148/302

[58] Field of Search .......................... 252/62.54, 62.57; 148/302

[56] References Cited

U.S. PATENT DOCUMENTS

| | | | |
|---|---|---|---|
| 4,684,406 | 8/1987 | Matsuura | 75/244 |
| 4,689,163 | 8/1987 | Yamashita | 252/62.54 |
| 4,767,474 | 8/1988 | Fujimura | 148/302 |
| 4,836,868 | 6/1989 | Yajima | 148/302 |
| 4,842,656 | 6/1989 | Maines | 148/302 |
| 4,873,504 | 10/1989 | Blume | 335/303 |
| 4,902,361 | 2/1990 | Lee | 148/302 |
| 4,975,213 | 12/1990 | Sakai | 252/62.53 |
| 5,000,800 | 3/1991 | Sagawa | 148/302 |
| 5,049,208 | 9/1991 | Yajima | 148/302 |
| 5,089,065 | 2/1992 | Hamano | 148/302 |

FOREIGN PATENT DOCUMENTS

| | | |
|---|---|---|
| 239031 | 9/1987 | European Pat. Off. . |
| 284033 | 9/1988 | European Pat. Off. . |
| 3938952 | 5/1990 | Fed. Rep. of Germany . |

OTHER PUBLICATIONS

Encyclopaedic Dictionary of Physics, "Anisotropy of Magnetic Properties", pp. 194–196, 1961.

Patent Abstracts of Japan-vol. 10, No. 319 (E-450)(2375) Oct. 30, 1986, & JP-A-61 129802 (Hitachi Metals Ltd) Jun. 17, 1986.

Patent Abstracts of Japan-vol. 12, No. 355 (E-661)(3202) Sep. 22, 1988, & JP-A-63 111603 (Santoku Kinzoku Kogyo K.K.) May 16, 1988.

*Primary Examiner*—Prince Willis, Jr.
*Assistant Examiner*—Thomas Steinberg
*Attorney, Agent, or Firm*—Wenderoth, Lind & Ponack

[57] ABSTRACT

A resin bonded magnet which comprises a resinous binder and melt quenched magnetically isotropic ferromagnetic alloy particles having a coercive force of 8 to 12 KOe of the formula: $Fe_{100-x-y-z}Co_xR_yB_z$ wherein R is at least one of Nd and Pr, x is an atomic % of not less than 15 and not more than 30, y is an atomic % of not less 10 and not more than 13 and z is an atomic % of not less than 5 and not more than 8; the ferromagnetic alloy particles uniformly dispersed in the binder.

4 Claims, 4 Drawing Sheets

RARE EARTH CONTAINING RESIN-BONDED MAGNET AND ITS PRODUCTION

This is a continuation-in-part of applicants' prior application Ser. No. 07/380,598 filed Jul. 17, 1989, which application is now abandoned.

BACKGROUND OF THE INVENTION

1. Field of the Invention

The present invention relates to a resin-bonded magnet and its production. More particularly, it relates to a resin-bonded magnet improved in magnetic characteristics and heat stability, which comprises ferromagnetic alloy particles of a rare earth element system, and its production.

2. Description of the Related Art

It is difficult to make sintered magnets of Fe-R-B (wherein R is a rare earth element) alloys or intermetallic compounds in a cylinder shape magnetically anisotropic along the radial direction. The main reason for this is because the cylinder suffers a difference in expansion coefficient based on the anisotropy during the sintering process, which difference in expansion coefficient being more or less influenced by the degree of the magnetic anisotropy and the shape of the cylinder. In order to avoid said difficulty, the cylinder has thus been used in an isotropic state. This, however, involves a disadvantage in that while magnetic characteristics should intrinsically reach 20 to 30 MGOe in terms of maximum energy product, it lowers to about 5 MGOe along the radial direction of the cylinder. Further, the cylindrical magnet must be ground after sintering for incorporation into a permanent magnet motor in which a high dimensional accuracy is required. This apparently results in a poor yield of the magnet product. Furthermore, the sintered magnet is mechanically brittle so that a part of the magnet is liable to come off and fly apart. If this occurs at a space between the rotor and a stator of the motor or at a sliding portion, the motor would suffer a serious problem with respect to maintenance of its performance and reliability.

With the background above, it was proposed to apply a magnetically isotropic resin-bonded magnet of Fe-B-R produced by a melt quenching process to a permanent magnet motor (U.S. Pat. No. 4,689,163), and according to this proposal, it has been made possible to cope with various demands. However, such resin-bonded Fe-B-R magnet is still unsatisfactory in various magnetic characteristics. For instance, $Fe_{83}Nd_{13}B_4$, as a typical example of said resin-bonded Fe-B-R magnet, shows the following magnetic characteristics irrespective of the magnet structure or shape or the magnetization direction: Br, 6.1 kG; bHc, 5.3 KOe; iHc, 15 KOe, (BH)max, 8 MGOe; temperature coefficient of Br, −0.19%/° C.; temperature coefficient of iHc, −0.42%/° C.; Curie temperature, 310° C. For application to a permanent magnet motor, the decrease of the magnetization energy is desired. Also, the improvement of Br and heat, such as the irreversible demagnetizing factor, is desirable in view of the pronounced tendency toward high efficiency, miniaturization and resistance to surroundings of a permanent magnet motor.

SUMMARY OF THE INVENTION

As the result of extensive studies, it has now been found that a resin-bonded magnet of a rare earth element system having a certain specific composition shows magnetic characteristics overcoming said problems and meeting said desires.

According to the present invention, there is provided a resin-bonded magnet which comprises a resinous binder and melt quenched magnetically isotropic ferromagnetic alloy particles having a coercive force of 8 to 12 KOe having a composition of the formula:

$$Fe_{100-x-y-z}Co_xR_yB_z \quad (I)$$

wherein R is at least one of Nd and Pr, x is an atomic % of not less than 15 and not more than 30, y is an atomic % of not less that 10 and not more than 13 and z is an atomic % of not less than 5 and not more than 8; said ferromagnetic alloy particles uniformly dispersed in said binder.

Preferably, the ferromagnetic alloy particles in the magnet is one produced by the melt quenching process and having a coercive force (iHc) of 8 to 12 KOe. Also, the resinous binder preferably is a heat-polymerizable resin, such as an epoxy resin.

The magnet of the invention may be produced by forming a granular complex material comprising a heat-polymerizable resin as a resinous binder and ferromagnetic alloy particles of the formula (I) uniformly dispersed therein in a green body and heating the green body at a temperature to polymerize the heat-polymerizable resin.

DETAILED DESCRIPTION AND EMBODIMENTS OF THE INVENTION

The reason why the melt quenched magnetically isotropic ferromagnetic alloy particles having the composition (I) are used in this invention will be explained below.

For decreasing the magnetization energy, it is generally effective to lower the level of the coercive force (iHc). On the other hand, the heat stability as represented by the irreversible demagnetizing factor may be considered to be a function influenced by the iHc level and the temperature (Curie temperature) coefficient of iHc. Therefore, it is necessary to decrease the level of the coefficient temperature of iHc to at least such an extent as corresponding to the decrease of iHc for decreasing the magnetization energy while assuring the heat stability.

In case of the composition (I), the value which has a serious influence on the level of iHc is y, indicating the atomic % of R. For instance, the iHc level at y=14.0-14.4 (z=5-6) is above 15 KOe (20° C.), and at y=10.0-13.0 (z=5-8) it is above 8 KOe (20° C.). The reason why the iHc level is above 15 KOe or above 8 KOe is due to the fact that the iHc level in both cases is more or less increased with the increase of x, indicating the atomic % of Co.

Figure 1:
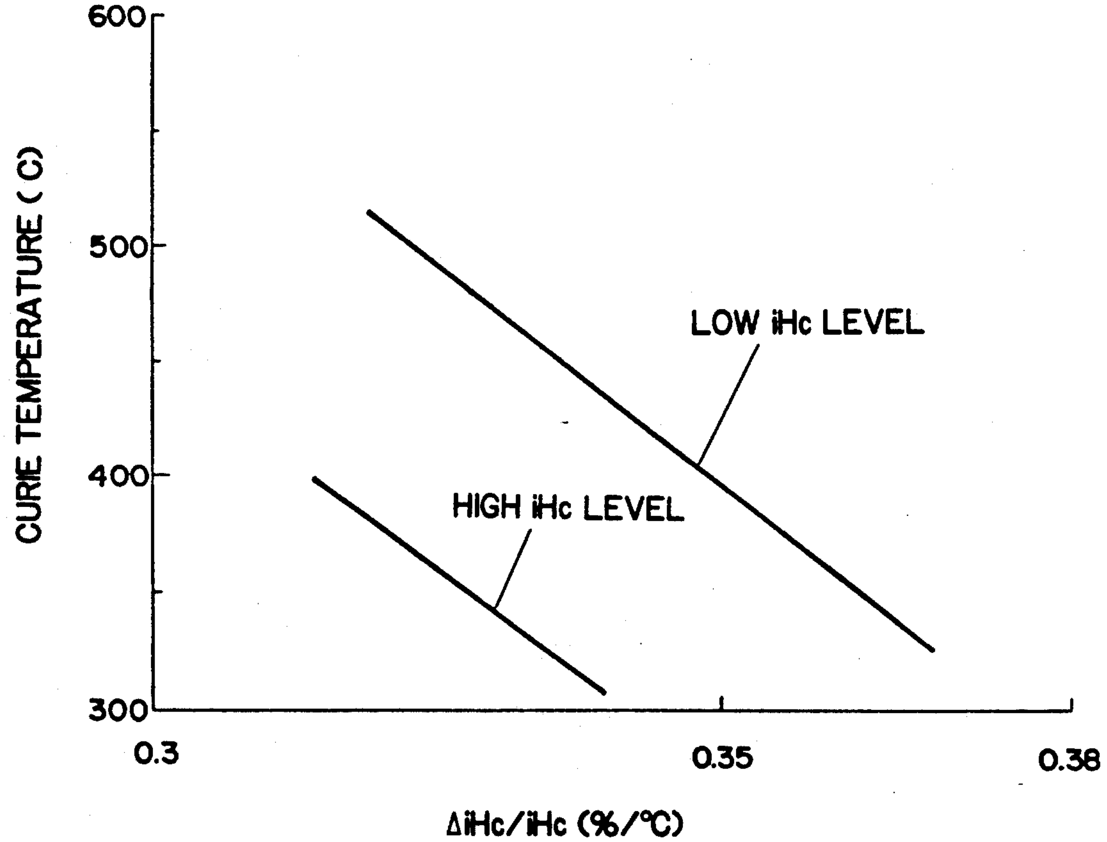
FIG. 1 is a graphical representation of the relationship between the temperature coefficient of iHc and the Curie temperature of the ferromagnetic alloy particles of the formula (I) at a high iHc level and at a low iHc level.

FIG. 1 shows the variation of the Curie temperature with the temperature coefficient of iHc on the ferromagnetic alloy particles having the composition (I) as produced by the melt quenching process at a high iHc level (y=14.0-14.4; z=5-8) and at a low iHc level (y=10.0-13.0; z=5-8) with different x values. The Curie temperature (Tc; ° C.) is represented by the formula: 10.095x+310.742 (wherein x is an atomic % of Co and a relative coefficient is $\gamma=0.996$), and controlled by x, irrespective of whether the iHc level is high or low. From FIG. 1, it is apparent that the temperature coefficient of iHc has a serious influence on the heat stability represented by the irreversible demagnetizing factor and varies with the iHc level, and when the iHc level is equal therewith, it depends on the Curie temperature; x indicating the atomic % of Co.

Figure 2:
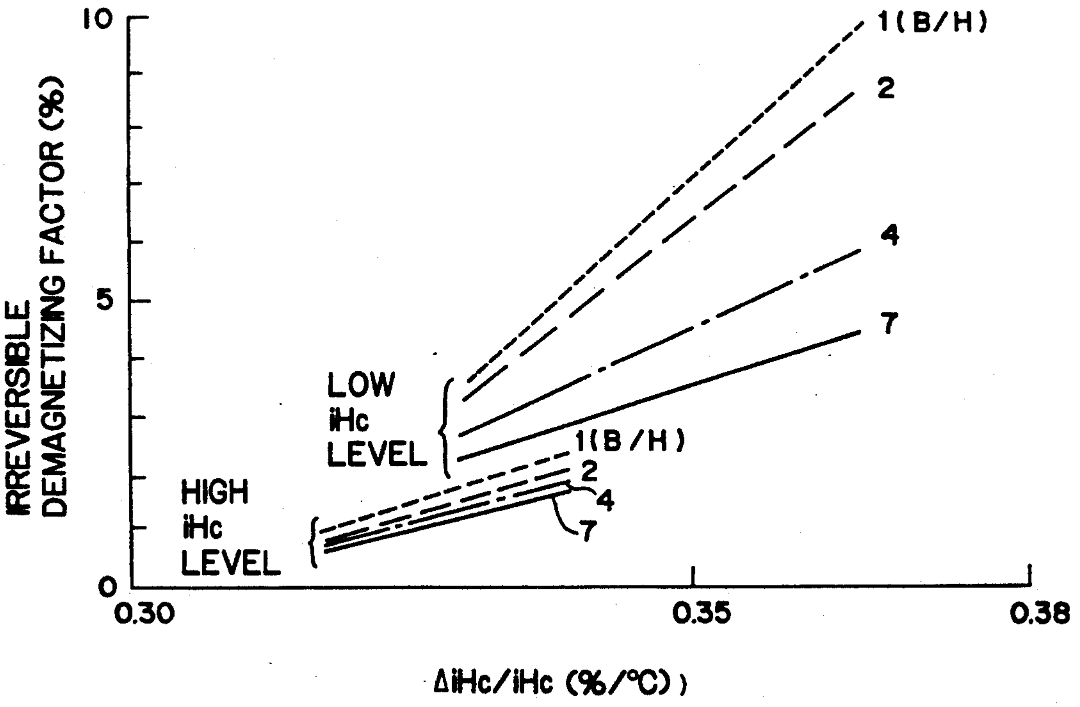
FIG. 2 is a graphical representation of the relationship between the temperature coefficient of iHc and the irreversible demagnetizing factor on the resin-bonded magnet prepared by the use of the ferromagnetic alloy particles of the formula (I) at a high iHc level and at a low iHc level.

FIG. 2 shows the variation of the irreversible demagnetizing factor with the temperature coefficient of iHc on the resin-bonded magnet manufactured by the use of the ferromagnetic alloy particles having the composition (I) as produced by the melt quenching process at a high iHc level (y=14.0-14.4; z=5-8) and at a low iHc level (y=10.0-13.0; z=5-8) with different x values. Manufacture of said resin-bonded magnet was carried out by forming a granular complex material comprising the ferromagnetic alloy particles and a heat-polymerizable resin as a resin binder into a green body and subjecting the green body to heat treatment for obtaining a resin-bonded magnet having an outer diameter of 0.5 cm and a permeance coefficient (B/H) of 1, 2, 4 or 7. The irreversible demagnetizing factor was determined by pulse magnetizing the resin-bonded magnet with 50 KOe in a longitudinal direction, measuring the magnetic flux (as the initial magnetic flux value) by the use of a Helmholtz coil and a flux meter, heating the resultant magnet at 150° C. for 0.5 hour, quenching the heated magnet to room temperature and measuring again the magnetic flux. From FIG. 2, it is apparent that the irreversible demagnetizing factor is controlled by the temperature coefficient of iHc when B/H is constant and the iHc level is the same. Also, the influence of B/H on the irreversible demagnetizing factor is decreased with a smaller temperature coefficient of iHc. As explained in FIG. 1, the temperature coefficient of iHc is controlled by x when the iHc level is the same. Accordingly, it is possible to assure a heat stability equal to that of a high iHc level even in case of a low iHc level insofar as the range of x is specified.

Figure 3:
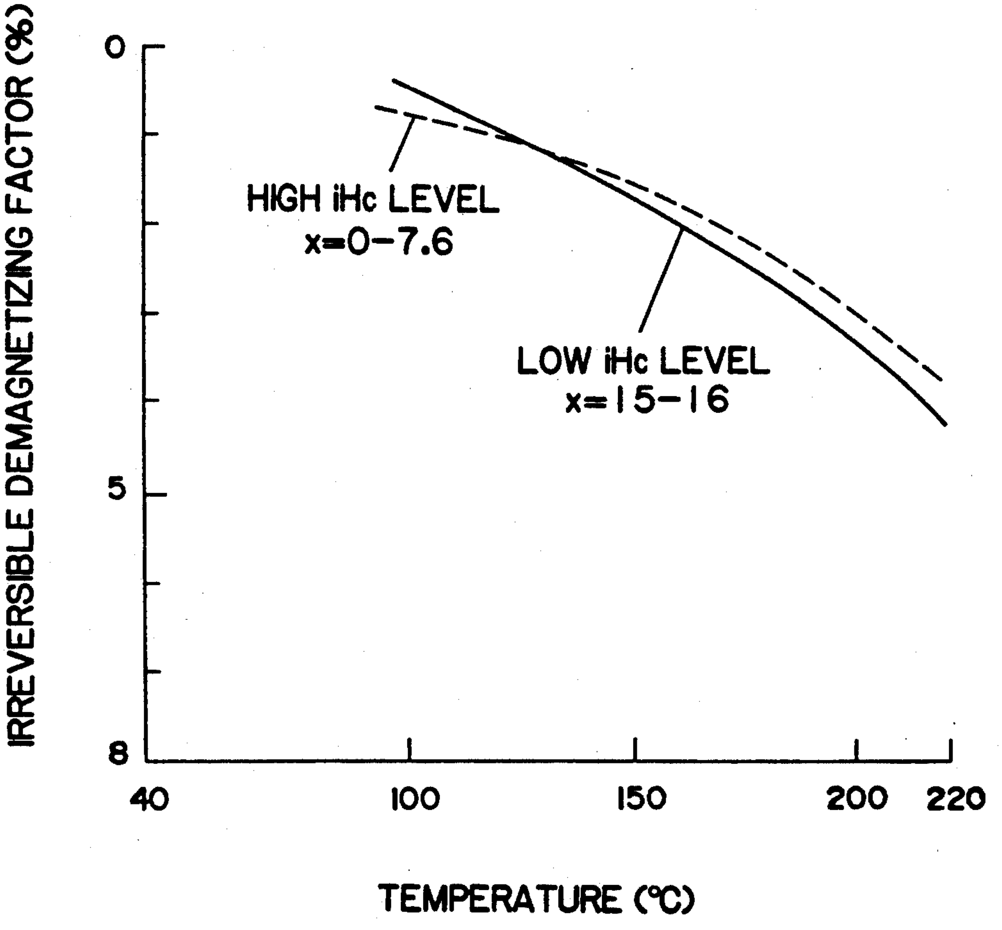
FIG. 3 is a graphical representation of the relationship between the temperature and the irreversible demagnetizing factor of the resin-bonded magnet prepared by the use of the ferromagnetic alloy particles of the formula (I) at a high iHc level and at a low iHc level.

FIG. 3 shows the variation of the irreversible demagnetizing factor with the temperature on the resin-bonded magnet manufactured by the use of the ferromagnetic alloy particles having the composition (I) as produced by the melt quenching process at a high iHc level (x=0-7.6; y=14.0-14.4; z=5 8) and at a low iHc level (x=15-16; y=10.0-13.0; z=5-8). Manufacture of said resin-bonded magnet was carried out by forming a granular complex material comprising the ferromagnetic alloy particles and a heat-polymerizable resin as a resin binder into a green body and subjecting the green body to heat treatment for obtaining a resin-bonded magnet having an outer diameter of 0.5 cm and a permeance coefficient (B/H) of 4. The irreversible demagnetizing factor was determined in the same manner as in FIG. 2 at a temperature of 60 to 220° C. From FIG. 3, it is understood that the heat stability represented by the irreversible demagnetizing factor is substantially equal between the low iHc level and the high iHc level when x is 15-16. The iHc level at the low iHc level (x=15-16) is 11 KOe, and this is approximately a 30% decrease in magnetization energy in comparison with the iHc level at the high iHc level (x=0-7.6) of 15-17 KOe. Br is also improved in about 10%.

The ferromagnetic alloy particles of the composition (I) is preferably the one produced by the melt quenching process and have a coercive force (iHc) of 8 to 12 KOe. The melt quenching process as explained, for instance, in U.S. Pat. No. 4,689,163 may be applied to production of the ferromagnetic alloy particles usable in this invention, if necessary, with any modification apparent to those skilled in the art. The ferromagnetic alloy particles have usually a particle size of about 50 to 300 micrometers (μm). Since they are normally in plates, their specific surface area is from about 0.04 to 0.05 $cm^2/g$ even when the particle size distribution is so broad as about 50 to 300 micrometers. Therefore, they can be completely wetted by the use of a resin binder in an amount of approximately 3% by weight or more. The ferromagnetic alloy particles are poor in flowability and therefore may be admixed with a resin binder to make a granular complex material, which can be subjected to powder molding.

The resin binder as usable in the invention comprises usually a heat-polymerizable resin, preferably an epoxy resin, as an essential component. In addition, it may comprise a curing (or crosslinking) agent for the heat-polymerizable resin and optionally one or more reactive or non-reactive additives such as a forming aid. The epoxy resin is intended to mean a compound having at least two oxirane rings in the molecule and being representable by the formula:

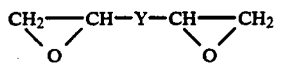

wherein Y is a polyfunctional halohydrin such as a residue formed through a reaction between epichlorohydrin and a polyvalent phenol. Preferred examples of the polyvalent phenol are resorcinol and bisphenols produced by condensation of a phenol with an aldehyde or a ketone. Specific examples of the bisphenols are 2,2'-bis(p-hydroxyphenylpropane) (bisphenol A), 4,4'-dihydroxybiphenyl, 4,4'-dihydroxybiphenylmethane, 2,2'-dihydroxydiphenyl oxide, etc. These may be used independently or as a mixture thereof. Particularly preferred are glycidyl ether type epoxy resins of the formula:

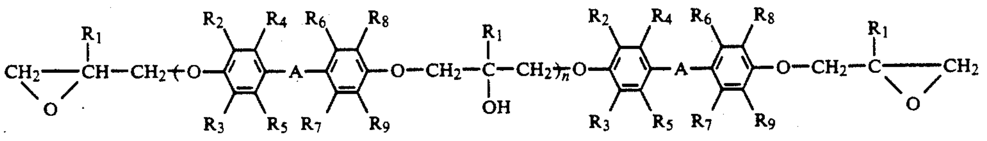

wherein $R_1$ is a hydrogen atom or a methyl group, $R_2$ to $R_9$ are the same or different and each a hydrogen atom, a chlorine atom, a bromine atom or a fluorine atom, A is an alkylene group having 1 to 8 carbon atoms, —S—, —O— or —$SO_2$— and n is an integer of 0 to 10.

As the curing agent for the epoxy resin, there may be used any conventional one. Specific examples of the curing agent are aliphatic polyamines, polyamides, heterocyclic diamines, aromatic polyamines, acid anhydrides, aromatic ring-containing aliphatic polyamines, imidazoles, organic dihydrazides, polyisocyanates, etc. Examples of the optionally usable additives are mono-epoxy compounds, aliphatic acids and their metal soaps, aliphatic acid amides, aliphatic alcohols, aliphatic esters, carbon-functional silanes, etc.

The above essential and optional components are mixed together to make a uniform mixture, which may be then granulated to make a granular complex material which is non-sticky and non-reactive at least at room temperature. In order to assure this requirement, there may be adopted any appropriate means. For instance, a substance showing a potential curability to the epoxy resin such as an organic dihydrazide or a polyisocyanate may be incorporated into the epoxy resin. Further, for instance, any component, usually a heat-polymerizable resin, may be microcapsulated so as to prevent its direct contact to any other reactive component such as a curing agent.

For microcapsulation, one or more polymerizable monomers which will form the film of microcapsules may be subjected to in situ polymerization, for instance, suspension polymerization in the presence of a heat-polymerizable resin, which is preferred to be in a liquid state at room temperature. Preferred examples of the polymerizable monomers are vinyl chloride, vinylidene chloride, acrylonitrile, styrene, vinyl acetate, alkyl acrylates, alkyl methacrylates, etc. The suspension polymerization may be effected by a per se conventional procedure in the presence of a polymerization catalyst.

The thus produced microcapsules are preferably in a single nuclear spherical form and have a particle size of several to several ten micrometers.

For production of a resin-bonded magnet of the invention, said ferromagnetic alloy particles of the composition (I) are mixed with the resin binder, preferably microcapsulated as above, to make a granular complex material. The granular complex material is optionally admixed with the resin binder, preferably microcapsulated as above and shaped by powder molding in a non-magnetic field into a green body, which is subjected to heat treatment for curing of the heat-polymerizable resin to give a resin-bonded magnet.

The resin-bonded magnet thus obtained is decreased in magnetization energy and improved in Br while assuring a good heat stability represented by an irreversible demagnetizing factor. The resin-bonded magnet may be incorporated into a permanent magnet motor, for instance, of a rotor type or of a field system type so that the resultant motor can produce excellent performances with high efficiency. In addition, it may have high resistance to its surroundings.

A practical embodiment of the invention is illustratively given in the following example.

EXAMPLE

Acrylonitrile and methyl methacrylate were subjected to in-situ polymerization in the presence of a glycidyl ether type epoxy resin (liquid) having a viscosity ($\eta$) of 100 to 160 poise at 25° C. obtained by the reaction between epichlorohydrin and bisphenol A for production of mononuclear spherical microcapsules containing said epoxy resin in an amount of 70% by weight and having an average particle size of 8 micrometers.

Separately, fine particles of $Fe_{65.2}Co_{16.2}Nd_{12.2}B_{6.3}$ (iHc, 11KOe; particle size, 53 to 350 micrometers) or $Fe_{81.0}Nd_{14}B_{5.0}$ (iHc, 15KOe; particle size, 53 to 350 micrometers) manufactured by the melt quenching process (96 parts by weight) were admixed with a 50% acetone solution of a glycidyl ether type epoxy resin having a melting point of 65 to 75° C. ("Durran's") (3 parts by weight). After evaporation of the solvent, the resulting material was pulverized and shieved to make granules having a particle size of 53 to 500 micrometers.

The resultant granules were admixed with the microcapsules (2 parts by weight), fine particles of 1,3-bis(hydrazinocarboethyl)-5-isopropylhydantoin of the formula:

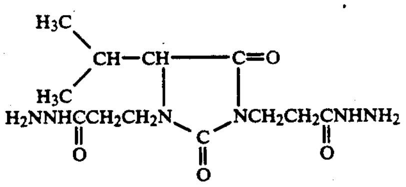

having a particle size of 5 to 10 micrometers (0.45 part by weight) and calcium stearate (0.2 part by weight) to give a granular complex material, which is non-sticky and non-polymerizable at room temperature and has powder flowability.

A layered core consisting of 22 annular electromagnetic steel plates each having an outer diameter of 47.9 mm, an inner diameter of 8 mm and a thickness of 0.5 mm was charged in a metal mold to make an annular cavity of 50.1 mm in diameter around said layered core. Into the annular cavity, said granular complex material was introduced and compressed under a load of 12 ton to make a ring-form green body. The green body was taken out from the metal mold and subjected to heat treatment at 120° C. for 1 hour so that the heat-polymerizable resin was cured.

Figure 4:
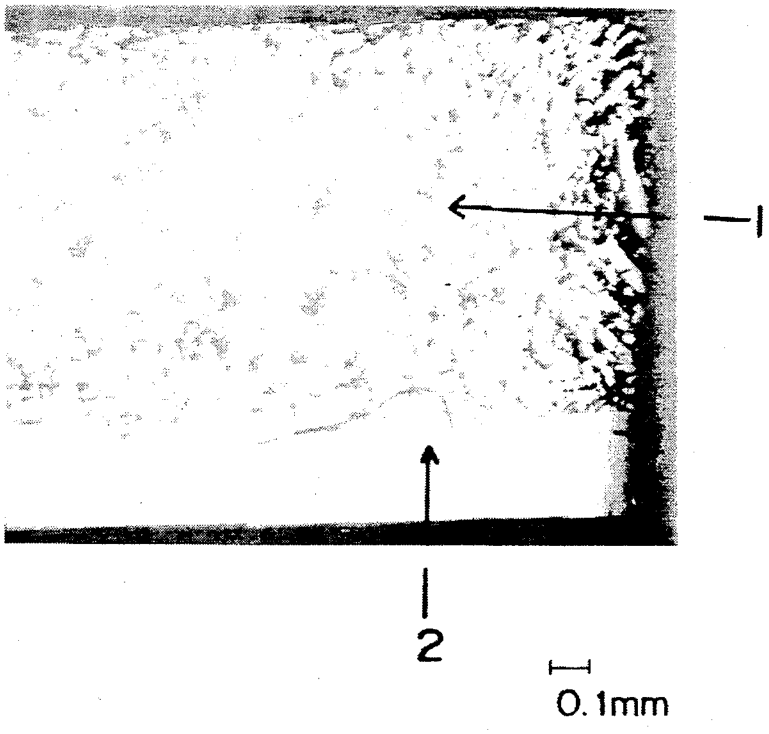
FIG. 4 is a microphotograph showing the particulate structure of a permanent magnet as an embodiment of the invention on the application to a permanent magnet motor.

The microphotograph showing the section of the essential part of the resin-bonded magnet and the layered electromagnetic steel plate is given in FIG. 4 of the accompanying drawings, wherein 1 is the resin-bonded magnet and 2 is the layered electromagnetic steel plate. The resin-bonded magnet had a density of 5.7 g/$cm^2$. In view of such density, the resin-bonded magnet of $Fe_{65.2}Co_{16.2}Nd_{12.2}B_{6.3}$ (iHc, 11.0 KOe) according is presumed to have the following magnetic characteristics: Br, 6.8 kG; bHc, 5.8 KOe; $(BH)_{max}$, 9.8 MGOe. The resin-bonded magnet of $Fe_{81.0}Nd_{14}B_{5.0}$ (iHc, 15 KOe) for comparison is presumed to have the following magnetic characteristics: Br, 6.1 kG; bHc, 5.2 KOe; $(BH)_{max}$, 7.9 MGOe.

A shaft was inserted into the center bore of the layered electromagnetic steel plate, and magnetization was made to the ring-form resin-bonded magnet with 4 pole pulse at the outer circumference to make a permanent magnet motor. The relationship between the torque on the fan load (1,420 rpm, 20° C.) and the magnetized current wave height is shown in Table 1 (the winding number of the exciting coil per each pole being 22).

TABLE 1

(Torque (kg.cm) in different current peak value for magnetization)

| Composition | Peak value of current for magnetization (KA) 10 | 12 | 13 | 14 |
|---|---|---|---|---|
| $Fe_{65.2}Co_{16.2}Nd_{12.2}B_{6.3}$ | 1.34 | 1.38 | — | — |
| $Fe_{81.0}Nd_{14.0}B_5$ | — | 1.20 | 1.22 | 1.25 |

As understood from Table 1, the motor according to the invention can decrease the magnetization energy 20-30% with a torque elevation of approximately 10% in comparison with a conventional motor.

Accordingly, it may be said that this invention can produce a decrease in the magnetization energy and an improvement of the Br while assuring heat stability represented by the irreversible demagnetizing factor. Thus, a permanent magnet motor can be made with high efficiency and miniaturization by this invention. Also, a permanent magnet and any other part material or article can be manufactured in an integral body.

What is claimed is:

1. A resin-bonded magnet for use in a permanent motor which comprises a resinous binder and melt quenched magnetically isotropic ferromagnetic alloy particles having a coercive force of 8 to 12 kOe of the formula:

$$Fe_{100-x-y-z}Co_xR_yB_z$$

wherein R is at least one of Nd and Pr, x is an atomic % of not less than 15 and not more than 30, y is an atomic % of not less than 10 and not more than 13 and z is an atomic % of not less than 5 and not more than 8; said ferromagnetic alloy particles uniformly dispersed in said binder.

2. The magnet according to claim 1, wherein the resinous binder is a heat-polymerizable resin.

3. The magnet according to claim 2, wherein the heat-polymerizable resin is an epoxy resin.

4. A process for producing the magnet according to claim 1, which comprises shaping a granular complex material comprising a heat-polymerizable resin as a resinous binder and ferromagnetic alloy particles having a coercive force of 8 to 12 KOe of the formula:

$$Fe_{100-x-y-z}Co_xR_yB_z$$

wherein R is at least one of Nd and Pr, x is an atomic % of not less than 15 and not more than 30, y is an atomic % of not less than 10 and not more than 13 and z is an atomic % of not less than 5 and not more than 8, said ferromagnetic alloy particles being uniformly dispersed in said binder to make a green body and heating the green body at a temperature to polymerize the heat-polymerizable resin.

* * * * *